UNITED STATES PATENT OFFICE.

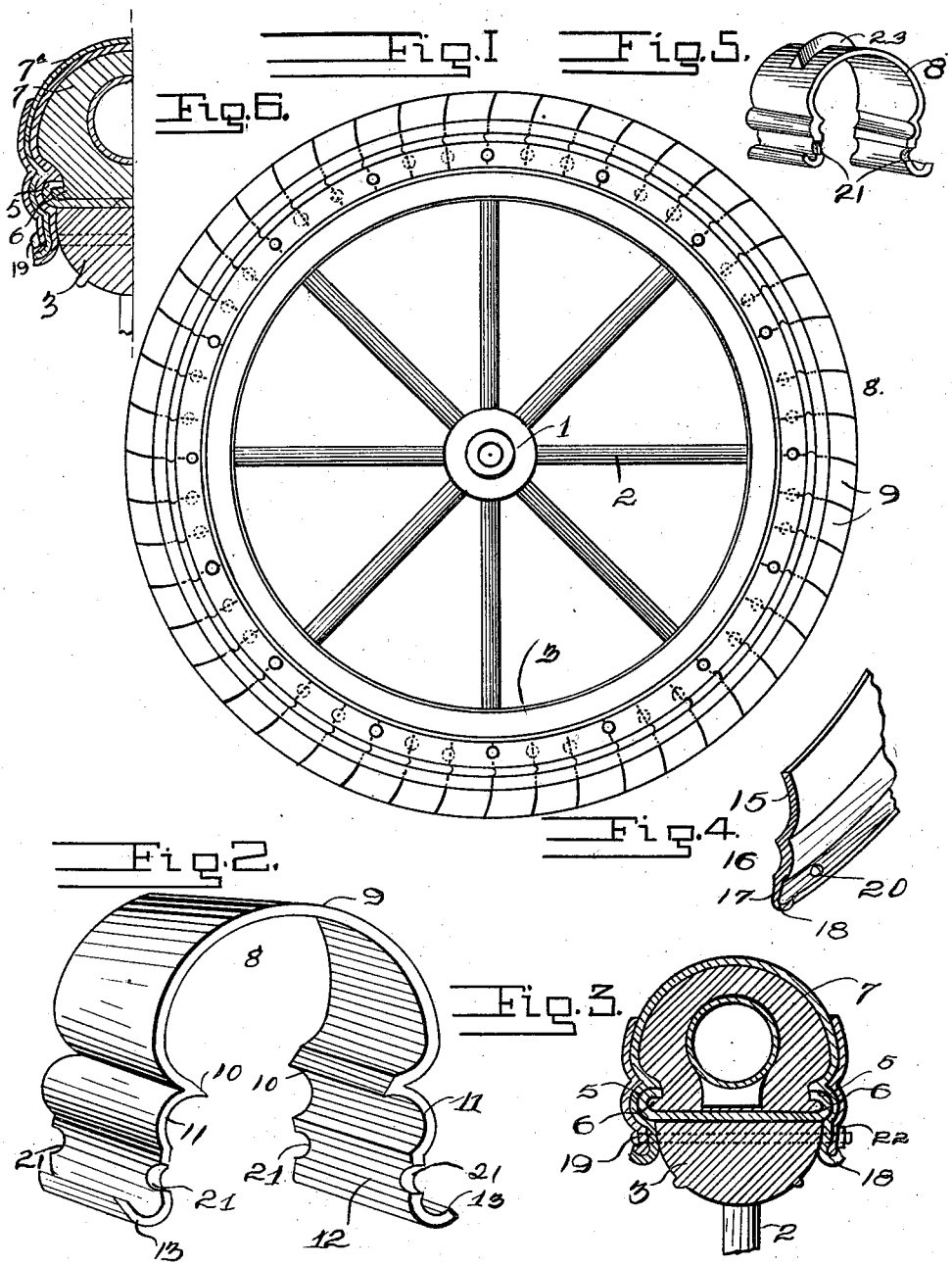

HENRY E. RECHNER, OF EAST TOLEDO, OHIO.

AUTOMOBILE-TIRE.

990,456.  Specification of Letters Patent.  Patented Apr. 25, 1911.

Application filed November 19, 1910. Serial No. 593,215.

*To all whom it may concern:*

Be it known that I, HENRY E. RECHNER, a citizen of the United States, residing at East Toledo, in the county of Lucas and State of Ohio, have invented certain new and useful Improvements in Automobile-Tires, of which the following is a specification, reference being had therein to the accompanying drawing.

This invention relates to automobile tires, and has special reference to devices for protecting such tires.

The invention has for its object to provide an improved durable and effective device of this kind which may be readily applied to and entirely or partly removed from a tire, and which will be of a light construction and will maintain the flexibility of the tire.

To this end the invention consists of an automobile tire and a protective device applied thereto as hereinafter set forth and claimed.

Referring to the accompanying drawings: Figure 1 is a view of an automobile wheel with the invention applied thereto. Fig. 2 is an enlarged detail view in perspective of one of the protecting clips. Fig. 3 is a detail view in cross section of the tire of an automobile wheel and the protecting device for the tire. Fig. 4 is a detail view in perspective of a portion of a metal band for securing the protecting device to a tire. Fig. 5 is a detail view in perspective of one of the elastic metallic clips provided with means for holding the wheel from slipping. Fig. 6 is a sectional view of the device provided with an outer covering fitting over the steel protectors.

1 indicates the hub of an automobile wheel, 2 the spokes and 3 the felly. Secured to the outer face of the felly 3 is a circumferential metal band 4 with an inturned flange 5 at each edge, by means of which the flanges 6 of the tire 7 are clenched to the band 4 and the felly 3.

In order to protect the tire a number of curved elastic metallic clips 8 are provided, each of which is formed with the curved portion 9 adapted to be sprung over and clench the tire, and with the internal lateral lips or flanges 10 which fit into the annular grooves in the tire in which the flanges 5 are seated. The clips 8 are further provided with the curved portions 11 which fit over the curved edges of the band 4, and with the curved extensions 12 which fit against the felly 3 and with the outwardly curved flanges 13 which project laterally from the felly. The tire 7 is covered with the curved metallic clips 8 which are sprung over the tire and arranged so as to abut edge to edge against each other. Each of the elastic metallic curved clips is held to the tire by the flanges 10 and the curved portions 11 clamped against the curved edges of the band 4. To hold the clips 8 securely in place annular clamping metallic strips 14 are provided which may be formed in one piece or in sections. Each of the annular clamping strips 14 is formed with a curved portion 15 which fits over a side of the clips 8, and with the curved portion 16 which fits over a curved portion of a clip 8, and a depending portion 17 with an outwardly curved edge 18 which fits into the outwardly curved flange 13 of the clip 8. The annular strips 14 are clamped to the clips 8 and are secured therewith to the felly 3 by bolts 19 which extend through holes 20 in the strips 14, and through holes formed by the semicircular recesses 21 in the abutting edges of the clips 8, and through the felly 3, and are secured by nuts 22.

From the foregoing discription it will be seen that the clips 8, and the annular strips 14 may be detachably secured to the tire and felly and will be firmly clamped in place on the tire and felly and may be readily and quickly removed for repair. The plurality of clips 8 form an effective protective covering for the tire and also by being separately secured to the tire will afford the desired flexibility for the tire.

The clips 8 are each provided with a suitable serrated or other surface to prevent the wheel from slipping laterally and also to enable it to rip up the surface of the ground when wet or covered with snow or ice.

In Fig. 5 is shown one of the clips 8, which is provided with a short rib 23 extending from its curved portion 9 and preferably of a triangular shape with a sharp edge, the several clips 8 being provided with a projection of this kind which serves to prevent the wheel from slipping and also enables it to take a firm hold on the ground when slippery.

It will be noticed in Fig. 1 that the clips 6 are held in place by the strips 14 and the bolts 19 located at intervals, as shown in full lines in Fig. 1, the clips between said bolts having their adjacent edges forming a bolt hole between each pair of clips. By having the clips 8 formed with the pairs of semi-circular recesses 21 should any one of the clips break it may be readily replaced and the bolt inserted between the renewed clip and the adjacent one.

In Fig. 6 the tire is shown provided with an outer covering 7ª which may be used when so desired so as to cover the steel clip protectors 9.

Having described the invention, I claim:

1. In a device of the character described, a metallic spring clip formed with a curved portion adapted to be sprung over a tire, opposite internal flanges adapted to engage the tire, curved portions beneath said flanges and curved portions depending from said curved portions and each forming an outwardly curved flange.

2. In a device of the character described, a wheel felly, a metallic strip with inturned flanges secured to said felly, a tire having a groove in each side clenched to said strip, a number of metallic clips sprung over said tire and abutting end to end, each of said clips having an internal horizontal flange on each side projecting into the groove formed between said strip and the overhang of the tire, a curved portion extending over the flanged edge of the metallic strip, and a depending curved portion bearing against the felly and having a lateral curved flange, an annular clamping metallic strip bearing against and extending longitudinally over the sides of said metallic clips and formed with a curved portion fitting over the sides of the metallic clips, and a curved portion fitting over the curved portions of the extensions of the metallic clips, and a depending portion with an outwardly extending flange seated in the flange at the lower edge of each side of the clips, and a detachable bolt passing through each of the extensions of said clips and through the annular metallic clamping strip at intervals and through the felly.

In testimony whereof I hereunto affix my signature in presence of two witnesses.

HENRY E. RECHNER.

Witnesses:
P. J. DOLAN,
C. F. HAITER.

---

Copies of this patent may be obtained for five cents each, by addressing the "Commissioner of Patents, Washington, D. C."